United States Patent
Bahl et al.

(10) Patent No.: US 8,243,612 B2
(45) Date of Patent: Aug. 14, 2012

(54) DYNAMIC CHANNEL-WIDTH ALLOCATION IN WIRELESS NETWORKS

(75) Inventors: Paramvir Bahl, Issaquah, WA (US); Ranveer Chandra, Kirkland, WA (US); Thomas Moscibroda, Redmond, WA (US); Sri Hari Narlanka, Bellevue, WA (US); Yunnan Wu, Redmond, WA (US); Yuan Yuan, Greenbelt, MD (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 11/832,624

(22) Filed: Aug. 1, 2007

(65) Prior Publication Data

US 2009/0034457 A1 Feb. 5, 2009

(51) Int. Cl.
*H04W 16/02* (2009.01)
*H04W 24/02* (2009.01)
*H04W 28/20* (2009.01)
*H04B 7/00* (2006.01)

(52) U.S. Cl. ........ 370/252; 370/254; 370/329; 370/338; 370/427; 455/450; 455/452.1; 455/453

(58) Field of Classification Search .................. 370/252, 370/254, 255, 329, 437, 477, 480, 482, 338; 455/452.1, 453, 450, 450.2; 709/224, 226
See application file for complete search history.

(56) References Cited

U.S. PATENT DOCUMENTS

| | | | |
|---|---|---|---|
| 5,678,178 A | 10/1997 | Tahkokorpi | |
| 5,722,043 A * | 2/1998 | Rappaport et al. | 455/452.1 |
| 5,809,423 A | 9/1998 | Benveniste | |
| 5,862,486 A * | 1/1999 | Przelomiec | 455/454 |
| 5,960,351 A * | 9/1999 | Przelomiec | 455/450 |
| 6,023,622 A | 2/2000 | Plaschke et al. | |
| 7,113,484 B1 | 9/2006 | Chapman et al. | |
| 7,269,151 B2 * | 9/2007 | Diener et al. | 370/329 |
| 7,315,533 B2 * | 1/2008 | Theobold et al. | 370/338 |
| 8,010,120 B2 * | 8/2011 | Daum | 455/450 |
| 8,150,955 B2 * | 4/2012 | Busch et al. | 709/223 |
| 2002/0181417 A1 * | 12/2002 | Malhotra et al. | 370/329 |
| 2003/0087645 A1 * | 5/2003 | Kim et al. | 455/453 |
| 2004/0042495 A1 | 3/2004 | Sandstrom | |
| 2004/0072571 A1 | 4/2004 | Halonen et al. | |
| 2004/0203828 A1 | 10/2004 | Mirchandani et al. | |

(Continued)

OTHER PUBLICATIONS

Qicheng Ma, Utility-Based Bandwidth Allocation and Link Scheduling in Wireless Networks: Linear Programming and Market-Oriented Approaches, thesis, Harvard College, Cambridge, Apr. 2006, pp. III-IX and 1-82.*

(Continued)

*Primary Examiner* — Chi Pham
*Assistant Examiner* — Ahmed Elallam
(74) *Attorney, Agent, or Firm* — Lee & Hayes, PLLC (57) ABSTRACT

Techniques for enhancing throughput capacity and/or bandwidth distribution fairness among APs in a wireless network are described. Specifically, a channel frequency profile which includes a center frequency and channel-width (i.e., channel bandwidth) is dynamically assigned to each of one or more APs in a wireless network. The assigned channel frequency profile for each AP is based, at least in part, on the current composition of the wireless network including, its topology and traffic load distribution. In this regard, each AP's channel frequency profile can be continuously or periodically changed such that the entire available frequency spectrum is effectively utilized and/or interference between APs is avoided or limited. This, in turn, enhances the throughput capacity and/or bandwidth distribution fairness of the wireless network.

19 Claims, 4 Drawing Sheets

U.S. PATENT DOCUMENTS

| | | | | |
|---|---|---|---|---|
| 2004/0235485 A1* | 11/2004 | Tanaka | ............................ | 455/447 |
| 2005/0078707 A1* | 4/2005 | Maltsev et al. | ................ | 370/471 |
| 2005/0113101 A1* | 5/2005 | Hansen et al. | ................ | 455/450 |
| 2006/0025150 A1* | 2/2006 | Kim et al. | ...................... | 455/453 |
| 2006/0109799 A1* | 5/2006 | Tseng et al. | ..................... | 370/254 |
| 2007/0201420 A1* | 8/2007 | Tejaswini et al. | ............. | 370/338 |
| 2008/0274748 A1* | 11/2008 | Lastinger et al. | ............. | 455/450 |
| 2009/0191907 A1* | 7/2009 | McCallister et al. | ......... | 455/501 |

OTHER PUBLICATIONS

Bahl et al, Load Aware Channel-Width Assignments in Wireless LANs, Microsoft Research,Technical Report, MSR-TR-2007-79, Jul. 2007, Preface page and pp. 1-12.*

Bahl et al, Cell Breathing in Wireless LANs:Algorithms and Evaluation, 2007 IEEE published on line on Dec. 14, 2006), pp. 164-177.*

Bejerano et al, Fairness and Load Balancing in Wireless LANs Using Association Control, Bell Laboratories, Lucent Technologies, Copyright 2004 ACM 1-58113-868-7/04/0009, pp. 315-329.*

Joshi et al, Progect Report on: Dynamic Channel Allocation for WLAN, Department of Electronics Engineering, Sardar Patel College of Engineering, 7 unumbred pages and pp. 1-53.*

Liu, et al., "Channel Assignment for Time-Varying Demand", available at least as early as May 17, 2007, at <<http://morse.uml.edu/Articles.d/globecomm01.pdf>>, pp. 5.

Anderson, "A simulation study of some dynamic channel assignment algorithms in a high capacity mobile telecommunications system", retrieved on May 18, 2007, at <<http://ieeexplore.ieee.org/Xplore/login.jsp?url=/iel5/25/34015/01622183.pdf?arnumber=1622183>>, IEEE, 2006, pp. 1.

Eriksson, "Capacity improvement adaptive channel allocation", retrieved on May 18, 2007, at <<http://ieeexplore.ieee.org/Xplore/login.jsp?url=/iel2/717/971/00026048.pdf?arnumber=26048>>, IEEE, 2006, pp. 1.

* cited by examiner

DYNAMIC CHANNEL-WIDTH ALLOCATION IN WIRELESS NETWORKS

BACKGROUND

Existing wireless networks typically adhere to wireless standards defining a certain number of channels, each having a fixed communication channel frequency width (i.e., fixed channel-width) available to access points (APs) configured to provide wireless access to clients. For example, wireless standards developed by the Institute of Electrical and Electronics Engineers (IEEE) and designated IEEE 802.11 divide the available communication frequency spectrum for wireless network communication into a fixed number of channels of equal channel bandwidth (e.g., 22 MHz width in IEEE 802.11b/g and 20 MHz width in IEEE 802.11a). While fixed-width channelization approaches are reasonably well suited for increasing throughput capacity and bandwidth distribution fairness in networks having a uniform and static device/traffic load distribution, they are not optimal in many existing wireless networks which tend to have a relatively imbalanced and dynamic device/traffic load distribution. This is because fixed channelization approaches fail to effectively utilize the entire available frequency spectrum and/or fail to avoid or limit the interference between APs using the same communication channel.

SUMMARY

Techniques for enhancing throughput capacity and/or bandwidth distribution fairness in a wireless network are described. In at least some embodiments, a communication channel frequency profile which includes a center-frequency and channel-width (i.e., channel bandwidth) is dynamically assigned to each of one or more APs in a wireless network. The assigned channel frequency profile for each AP is based, at least in part, on the current composition of the wireless network, including its topology and traffic load distribution. By virtue of the fact that both the center-frequency and the channel-width for each AP are treated as dynamically configurable parameters, each AP's channel frequency profile can be continuously or periodically changed such that the entire available frequency spectrum is effectively utilized and/or interference between APs is avoided or limited. This, in turn, enhances the throughput capacity and/or bandwidth distribution fairness of the wireless network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for enhancing throughput capacity and/or bandwidth distribution fairness in a wireless network. These techniques generally involve implementing a dynamic-width channelization approach which leverages the ability of individual APs to adjust the center-frequency setting and/or channel bandwidth (i.e., channel-width) setting, and thus the frequency profile, at which they operate to provide one or more client devices with access to the wireless network. In this regard, each individual AP can be assigned any center-frequency and channel-width, or alternatively, a certain center-frequency and/or channel-width from pre-defined center-frequencies and/or channel-widths, within the available frequency spectrum to use. Each of these assignments can be based, at least in part, on information associated with the current composition of the wireless network. By way of example and not limitation, this composition can include the network topology (including the current distribution of client devices and APs and which APs and/or client devices are interfering with one another with respect to their transmissions) and traffic load distribution in the wireless network.

This approach allows the entire frequency spectrum available to the APs to be effectively utilized and/or interference between APs to be avoided or limited. Specifically, since each AP's channel-width is treated as a dynamically configurable parameter, each AP is not required to operate at the same channel-width and can instead operate at a channel-width which correlates (e.g., is proportional) with the traffic load demand (data transfer requirement) placed on it by one or more client devices. Furthermore, to avoid or limit potential interference from other APs, each AP can operate at a center-frequency and channel-width associated with a minimal amount of interference from other APs. Advantageously, to account for the dynamic nature of wireless networks, information about the composition of the wireless network can be continuously or periodically evaluated such that an updated center-frequency and channel-width for each AP can be assigned whenever it is deemed appropriate.

While this can be accomplished in any suitable way, in at least some embodiments, information about the wireless network is received (i.e., collected) and evaluated in a coordinated fashion by one or more management modules to assign (i.e., allocate) a center-frequency and a channel bandwidth for each AP associated with the wireless network. Without limitation, this information can include data associated with a current communication traffic load associated with each AP, a channel frequency profile for each AP and a transmission power for each AP. As such, coordinated decisions with respect to assigning center-channels and channel-widths to individual APs in the wireless network can be made in the context of the current composition of the wireless network infrastructure as a whole. In other words, by utilizing an "infrastructure-wide" view of the entire wireless network based on the received information, a channel-width allocation scheme for each AP can be selected that results in an optimal, or near-optimal (and thus enhanced) throughput capacity with respect to the wireless network as a whole and/or an optimal, or near-optimal, (and thus enhanced) bandwidth distribution fairness among each of the APs/client devices. For instance, in at least some embodiments, total throughput can be increased by 50% or more over current state-of-the-art solutions while bandwidth distribution fairness can be increased by 30% or more when measured using Jain's fairness index.

Multiple and varied implementations and embodiments are described below. Generally, any of the functions described with reference to the figures can be implemented using software, firmware (e.g., fixed logic circuitry), manual processing, or a combination of these implementations. The term, "module" or "component" as used herein generally represents software, firmware, or a combination of software and firmware. For instance, in the case of a software implementation, the term" "module" or "component" represents program code (or declarative content) that performs specified tasks when executed on a processing/computing device or devices (e.g., CPU or CPUs). The program code can be stored in one or more computer readable memory devices. More generally, the illustrated separation of modules, components and functionality into distinct units may reflect an actual physical grouping and allocation of such software and/or hardware, or can correspond to a conceptual allocation of different tasks to one or more software program(s) and/or hardware unit(s), or any combination thereof. The illustrated modules, components and functionality can be located at a single site (e.g., as implemented by a processing/computing device), or can be distributed over multiple locations (e.g., as implemented by multiple processing/computing devices).

Exemplary System

Figure 1:
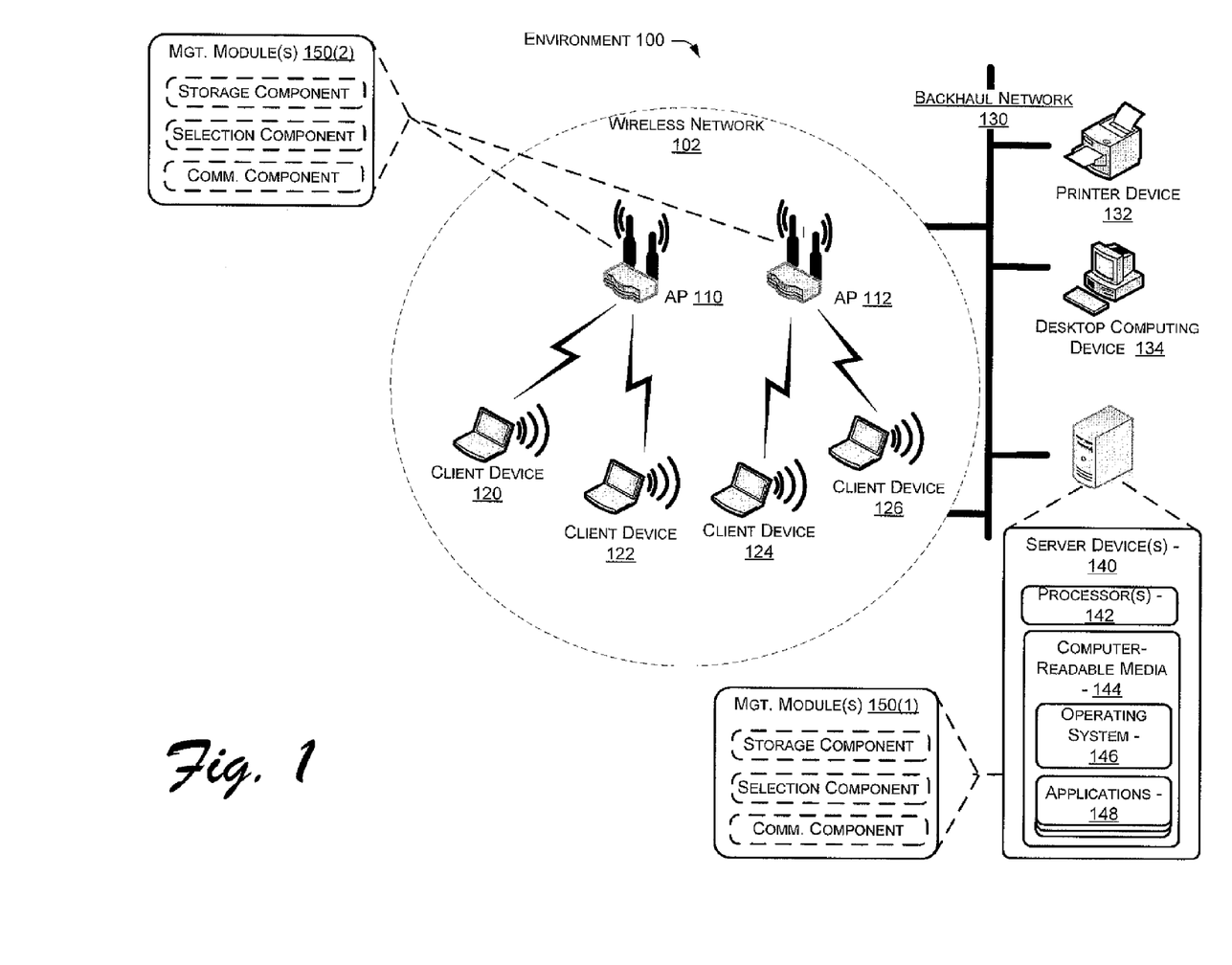
FIG. 1 illustrates an exemplary system for implementing the disclosed techniques, in accordance with at least one embodiment.
Figure 2:
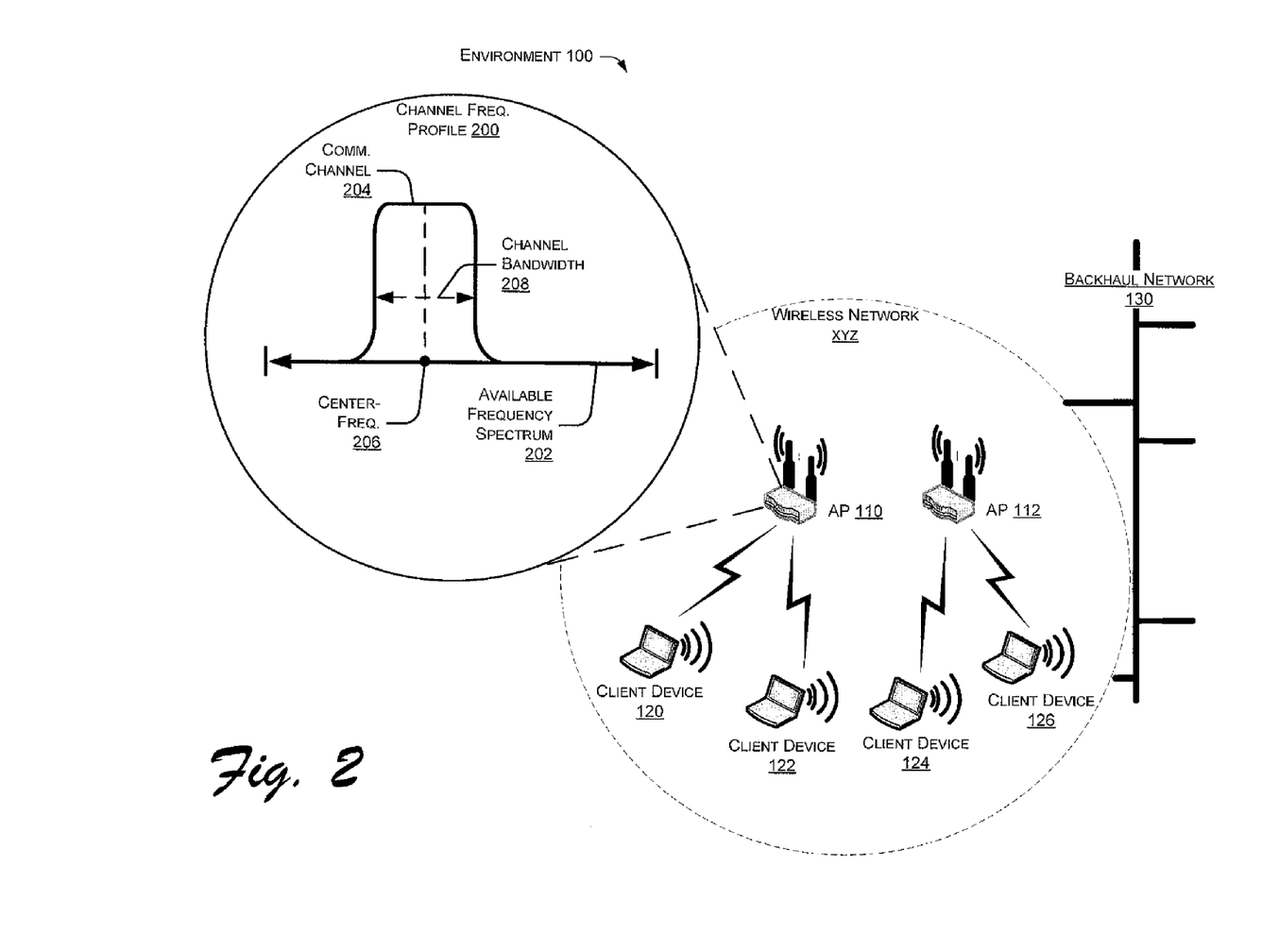
FIG. 2 illustrates an exemplary system for implementing the disclosed techniques, in accordance with at least one embodiment.

FIGS. 1 and 2 collectively illustrate an exemplary environment 100 for implementing the disclosed techniques directed to enhancing the throughput capacity and/or bandwidth distribution fairness in a wireless network, in accordance with at least one embodiment. It is to be appreciated that environment 100 is but one example of a suitable environment and is not intended to suggest any limitation as to the scope of use or functionality of the disclosed subject matter. As such, the various described embodiments can be operational with numerous other general purpose or special purpose environments, systems or configurations. Neither should environment 100 be interpreted as having any dependency or requirement relating to any one or combination of components illustrated therein.

As illustrated in FIG. 1, environment 100 includes wireless network 102 which wirelessly links multiple computing devices within a coverage area by allowing the computing devices to communicate wirelessly using known modulation techniques, as will be understood and appreciated by one skilled in the art. To accomplish this, wireless network 102 includes multiple wireless access points (APs) (i.e., nodes), each having a certain wireless transmission range. The combined range of these APs defines the coverage area provided by wireless network 102. For the sake of clarity, and due to the physical constraints of the pages upon which FIGS. 1 and 2 appear, wireless network 102 is depicted as only including two APs, designated here as AP 110 and AP 112. However, it is to be appreciated and understood that wireless network 102 can include any number of APs without deviating from the course and scope of the claimed subject matter.

Environment 100 also includes multiple client devices which are configured to wirelessly access wireless network 102 via the multiple APs. For the sake of clarity, and due to the physical constraints of the pages upon which FIGS. 1 and 2 appear, only four mobile client devices, client device 120, client device 122, client device 124 and client device 126 are depicted here. However, it is to be appreciated and understood that environment 100 can include any number of mobile client devices, and/or any number of non-mobile client devices, without deviating from the course and scope of the claimed subject matter. Furthermore, although these devices are illustrated in the form of mobile laptop computers, it is to be appreciated and understood that other computing devices can be utilized without departing from the spirit and scope of the claimed subject matter. Other computing devices can include, by way of example and not limitation, portable computers, handheld computers such as personal digital assistants (PDAs), cell phones, tablet computers, smart phones and the like capable of wirelessly connecting to wireless network 102.

By virtue of the fact that at least some of the client devices in environment 100 are mobile and can change their traffic demand (i.e., data transfer demand), the composition (e.g., as noted above, the wireless network topology and traffic load distribution) of wireless network 102 is dynamic in that it can dramatically change over time. For instance, any number of client devices can move into or out-of range of wireless network 102 (i.e., into or out-of range of one or more of the APs in wireless network 102) at any time. In addition, any number of client devices can move to various positions within range of wireless network 102 at any time thus dynamically changing the number and proximity of client devices with respect to any particular AP. Finally, any number of client devices can increase or decrease their traffic demand on an particular AP at any time—thus changing the traffic load of the wireless network.

Environment 100 also includes a backhaul network (typically wired and/or wireless network mesh), such as a local area network (LAN) or the like, depicted here as backhaul network 130. Backhaul network 130 communicatively links any number of networked resources such as, without limitation, printer devices (one of which is shown here as printer device 132), desktop computing devices (one of which is shown here as desktop computing device 134) and server devices (shown here as server device(s) 140). In addition, backhaul network 130 can be communicatively linked (i.e., coupled) with any number of other backhauled and/or wireless networks, including without limitation LANS, wide area networks (WANs), the Internet and the like. In this regard, backhaul network 130 is communicatively linked with wireless network 102 via each of the APs in wireless network 102. Recall that each of these APs, in turn, is configured to provide one or more client devices, such as mobile client devices 122-126, with wireless access to wireless network 102. As such, each AP effectively provides a communicative bridge between client devices, wireless network 102, backhaul network 130 (including any networked resources thereon) and any other backhauled and/or wireless networks communicatively linked with backhaul network 130 or wireless network 102.

As discussed in her detail below, by virtue of each AP being communicatively linked to backhaul network 130, information can be transferred between each AP (and thus each client device associated with an AP) in wireless network 102 and one or more server devices, such as server device(s) 140 depicted here. Server device(s) 140 may be implemented as one or more of a variety of suitable computing devices, including, for example, servers, desktop PCs, notebooks or portable computers, workstations, mainframe computers, and the like. Server device(s) 140 includes one or more processors 142 and one or more computer-readable media 144. In addition, residing on computer-readable media 144 is operating system 146 and one or more software server applications 148, both off which are executable by processor(s) 142.

Environment 100 also includes one or more management modules responsible for one or more tasks associated with dynamically assigning AP 110 and AP 112 a channel frequency profile based, at least in part, on the current composition of wireless network 102. These one or more management modules can include, without limitation, (1) a storage component to store information received from one or more devices associated with wireless network 102, (2) a selection component to evaluate the information and, based at least in part on the evaluated information, allocate a channel frequency profile for AP 110 and AP 112, and/or (3) a communication component to direct AP 110 and AP 112 to use the channel frequency profile assigned (i.e., allocated) to it.

Recall from above that modules and components can correspond to a conceptual allocation of different tasks to one or more software program(s) and/or hardware unit(s), or any combination thereof. In this regard, modules such as one or more central management modules and components such as the storage, selection and/or communication components can be implemented centrally on one or more server devices. Accordingly, management module(s) 150(1) is depicted here as being implemented on server device(s) 140. Alternatively or additionally, one or more central management modules can be implemented in a distributed fashion, such as on one or more of the APs for example. Accordingly, management module(s) 150(2) is depicted here as also being implemented on AP 110 and AP 112.

As noted above, the disclosed techniques leverage the ability of individual APs, such as AP 110 and AP 112 depicted in FIGS. 1 and 2, to adjust the center-frequency setting and/or channel bandwidth (i.e., channel-width) setting, and thus the assigned frequency profile, at which they operate to provide client devices with access to wireless network 102. As such, AP 110 and AP 112 are each configurable such that their respective channel frequency profiles can be adjusted either programmatically or by any other suitable means.

In this regard, FIG. 2 illustrates channel frequency profile 200 for AP 110 which, as will be appreciated and understood by those skilled in the art, can be thought of in terms of a total available frequency spectrum (typically measured in hertz (Hz)), depicted here as available frequency spectrum 202, available to the transmission receiver(s) on AP 110 for wireless network communication. Note that for the sake of clarity, and due to the physical constraints of the pages upon which FIGS. 1 and 2 appear, a channel frequency profile for AP 112 is not depicted. However, it is to be appreciated and understood that AP 112, and potentially any other AP which becomes associated with wireless network 102, can also be associated with a corresponding channel frequency profile similar to channel frequency profile 200.

All or a portion of available frequency spectrum 202 is available as a communication channel to AP 110, and any other APs associated with wireless network 102, for wireless communication. Here, communication channel 204 is depicted as using a portion of available frequency spectrum 202. The portion that a communication channel uses can be termed the frequency interval for that channel. As will be appreciated and understood by those skilled in the art, the bandwidth (channel-width) of the portion of available frequency spectrum 202 used by a communication channel typically positively correlates with the data throughput capacity (available data transfer rate) associated with that communication channel. In other words, the amount of data capable of being transferred over a communication channel is generally proportional to that channel's bandwidth. The location of communication channel 204 along available frequency spectrum 202 is defined by center frequency 206, while the size (width) of communication channel 204 with respect to available frequency spectrum 202 is defined by channel bandwidth (i.e. channel-width) 208. As noted above, since center-frequency 206 and/or channel bandwidth 208 can be adjusted to any center-frequency and bandwidth respectively (within available frequency spectrum 202), center frequency 206 and channel bandwidth 208 can be considered to be configurable parameters with adjustable settings. Together, these settings define channel frequency profile 200.

As noted above, existing wireless standards, such as those developed by the Institute of Electrical and Electronics Engineers (IEEE) and designated IEEE 802.11, divide the available communication frequency spectrum into a fixed number of channels of equal channel bandwidth. As such, APs with different traffic loads (e.g., APs associated with different quantities of client devices and/or with client devices having different traffic commands) are required to use the same channel-width. This can lead to unfair bandwidth distribution among APs and ineffective use of the available frequency spectrum (and thus decreased overall wireless network throughput) since APs with smaller traffic loads do not use the channel bandwidth available to them while APs with larger traffic loads are prevented from using this unused bandwidth. Advantageously, the disclosed techniques are directed to enhancing the overall throughput capacity and bandwidth distribution fairness in a wireless network such as wireless network 102. These techniques generally involve leveraging the ability of individual APs in the wireless network, such as AP 110 and AP 112, to adjust their center-frequency setting and/or channel frequency width (i.e., channel-width) setting.

Exemplary Implementation

Figure 3:
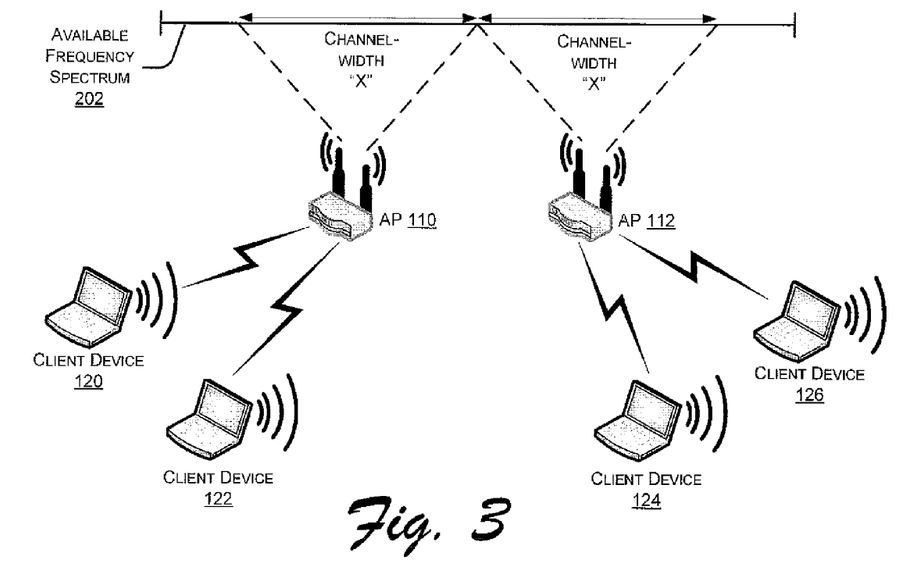
FIG. 3 illustrates an exemplary implementation directed to enhancing the throughput capacity and/or bandwidth distribution fairness in a wireless network, in accordance with at least one embodiment.
Figure 4:
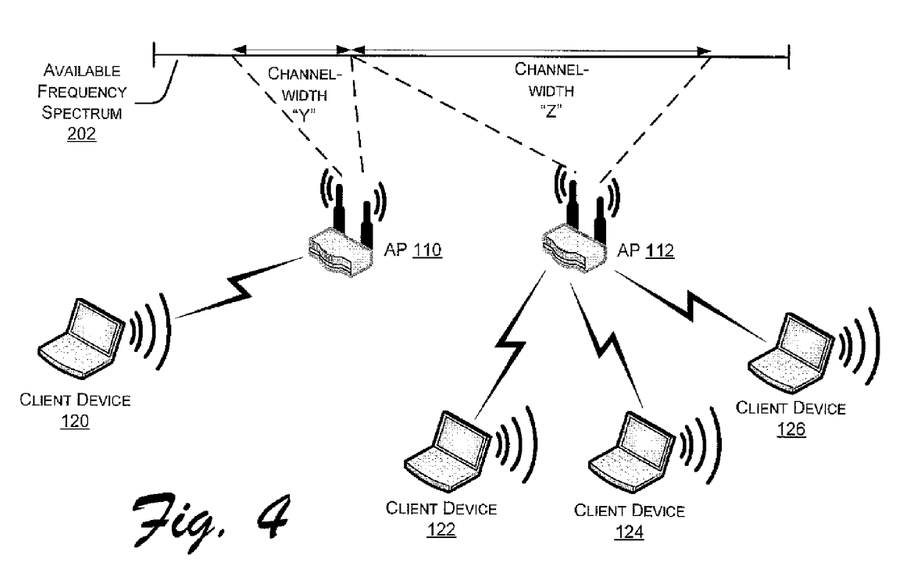
FIG. 4 illustrates an exemplary implementation directed to enhancing the throughput capacity and/or bandwidth distribution fairness in a wireless network, in accordance with at least one embodiment.

FIGS. 3 and 4 collectively illustrate an exemplary implementation directed to enhancing the throughput capacity and/or bandwidth distribution fairness in a wireless network by using the disclosed dynamic-width channelization techniques. For discussion purposes, this exemplary implementation is described in the context of environment 100 above. In this regard, each AP (AP 110 and AP 112) and each client device (client device 120, client device 122, client device 124 and client device 126) is associated with wireless network 102 such that each client device is provided with wireless access to wireless network 102 via one of the APs.

In FIG. 3, AP 110 is depicted as being communicatively coupled to client device 120 and client device 122 such that AP 110 provides each of these client devices with wireless access to wireless network 102. Similarly, AP 112 is depicted as being communicatively coupled to client device 124 and client device 126 such that AP 112 provides each of these client devices with wireless access to wireless network 102. For discussion purposes, client device 120, client device 122, client device 124 and client device 126 can all be thought of as having the same traffic load demand (data transfer requirement). As such, AP 110 and AP 112, as depicted in FIG. 3, are each associated with the same traffic load. However, it is to be appreciated and understood that in other embodiments, these client devices can be associated with different load demands without deviating from the course and scope of the claimed subject matter.

Since, for discussion purposes, AP 110 and AP 112 are associated with the same traffic load, each AP is using a communication channel associated with the same channel bandwidth, here represented as bandwidth "X". Note that in is example, AP 110 and AP 112 are not using overlapping communication channels. However, it is to be appreciated and understood that AP 110 and AP 112 can use overlapping communication channels (overlapping frequency intervals) in alternative implementations without deviating from the course and scope of the claimed subject matter.

Continuing, in FIG. 4, client device 122 is no longer communicatively coupled to AP 110 to access wireless network 102. Instead, client device 122 is now communicatively coupled to AP 112 to access wireless network 102. This change can occur for a variety of reasons. By way of example and not limitation, client device 122 may physically move to a location closer to AP 112, AP 110 and/or AP 112 may change its transmission power such that client device 122 becomes disassociated with AP 110 and associates with AP 112, and/or AP 110 may be directed to disassociate with client device 122 and AP 112 may be directed to associate with client device 122. Regardless of the reason for this change, note that AP 110 is now associated with a different traffic load than AP 112. Specifically, since for discussion purposes client device 120, client device 122, client device 124 and client device 126 can all be thought of as having the same traffic load demand, AP 110 is now associated with only ⅓ of the traffic load that AP 112 is associated with.

Accordingly, utilizing the disclosed techniques which leverage the ability of individual APs in the wireless network to adjust their center-frequency setting and/or channel-width setting, AP 110 can be assigned a channel-width that corresponds (e.g., is proportional) with its decreased traffic load, here represented as bandwidth "Y", and a frequency interval associated with little or no transmission interference. Similarly, AP 112 can be assigned a communication channel with a channel-width that corresponds with its increased traffic load, here represented as bandwidth "Z", and a frequency interval associated with little or no transmission interference. As such, each AP is not required to use the same communication channel (i.e., each AP is not required to use the same channel-width or the same center-channel), which would result in an unused portion of available bandwidth as described above. Instead, each AP is assigned a channel-width (and potentially a different center-frequency) associated with a more enhanced use of available frequency spectrum 202. In other words, since AP 112 is currently a hotspot compared to AP 110, AP 112 can be assigned more bandwidth (channel-width "Z") while AP 110 can be assigned less bandwidth (channel-width "Y"), thus increasing the overall throughput capacity (at least in part by utilizing more of available frequency spectrum 202) and per-client bandwidth distribution fairness in wireless network 102. In addition, this can be accomplished such that transmission interference is avoided or limited.

Furthermore, in large-scale networks where different APs may not be within mutual interference range, it may be beneficial to reuse parts of the available frequency spectrum (frequency reuse), as will be appreciated and understood by those skilled in the art. In other words, same parts of the available frequency spectrum can be assigned to APs that are not interfering with one another or that are only nominally interfering with one another.

Note that determining a center-frequency and/or channel-width to assign to each AP can be accomplished in any suitable way. By way of example and not limitation, in at least some embodiments, as described in more detail below, one or more optimization algorithms are used to evaluate information about wireless network 102 and, based at least in part on the evaluated information, determine a center-channel and/or channel-width to assign to each AP.

Exemplary Process

Figure 5:
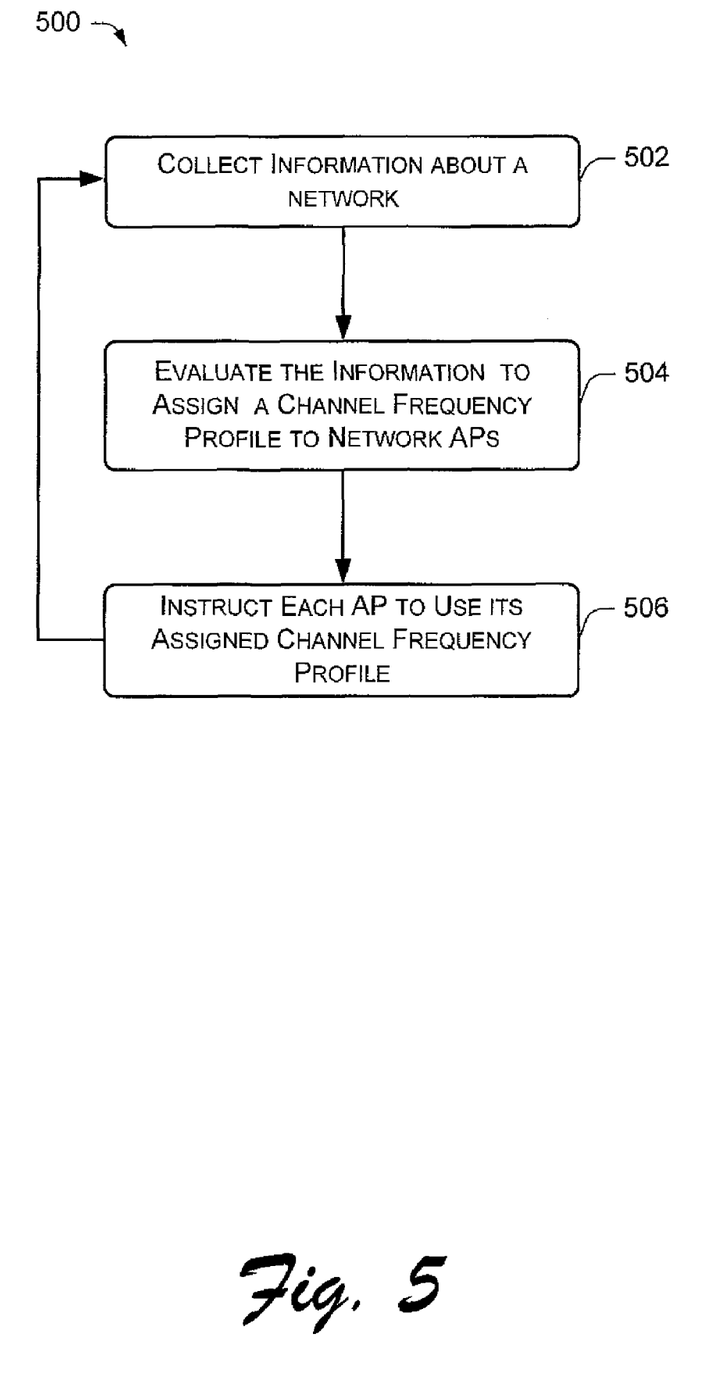
FIG. 5 illustrates an exemplary process, in accordance with at least one embodiment.

FIG. 5 illustrates an exemplary process 500 for implementing the disclosed techniques. Process 500 is illustrated as a collection of blocks in a logical flow graph which represents a sequence of operations that can be implemented in hardware, software, or a combination thereof. In the context of software, the blocks represent computer instructions that, when executed by one or more processors, perform the recited operations. The order in which this process is described is not intended to be construed as a limitation, and any number of the described blocks can be combined in any order to implement the process, or an alternate process. Additionally, individual blocks may be deleted from the process without departing from the spirit and scope of the subject matter described herein.

At block 502, information about a network, such as wireless network 102 described above, is collected. This information, which is associated with the composition of the network, can include, without limitation, data about the current communication traffic load of each of one or more APs in the network (e.g., the current number of client devices associated with each AP and/or the current traffic demands of each associated client device), a channel frequency profile for each AP and a transmission power for each AP. In other words, data about the current distribution of APs, client devices, and traffic load in the network can be received from one or more devices associated with the network. By way of example and not limitation, these devices can include APs, client devices, server devices and the like which are temporarily or permanently communicatively linked with the network. Furthermore, as noted above, in at least some embodiments the received information can be stored by a storage component on one or more management modules.

At block 504, the information is evaluated to assign a channel frequency profile to each of the APs. In other words, based at least in part on the evaluated information associated with the composition of the network, a center-frequency and/or a channel-width are assigned to each AP. As noted above, this can be accomplished in any suitable way. By way of example and not limitation, in at least some embodiments one or more optimization algorithms are used to evaluate the information and select channel frequency profile settings (for each AP) that are associated with enhancing the throughput capacity and/or bandwidth distribution fairness in the network. As noted above, in at least some embodiments, a selection component on one or more management modules is responsible for accomplishing this.

For discussion purposes, the network throughput capacity can be considered the total data transfer rate available to client devices in the network while the bandwidth distribution fairness can be considered the equitable allocation of available bandwidth among devices, such as client devices and/or APs, associated with the network. Bandwidth distribution fairness can be measured in any suitable way. By way of example and not limitation, in at least some embodiments, per-client bandwidth distribution fairness is measured according to an index known as Jain's fairness index. The index is calculated using $(\Sigma c_i)^2 / n\Sigma c_i^2$, where $c_i$ is the bandwidth obtained by client i, and n is the total number of clients.

As discussed in detail below, enhancing the overall throughput capacity and/or bandwidth distribution fairness can be expressed in the form of a "solvable" problem capable of being "solved" by one or more of the optimization algorithms. Unfortunately, as will be appreciated and understood by those skilled in the art, in many cases a tradeoff can exist between achieving an optimal, or near-optimal, throughput capacity and an optimal, or near-optimal bandwidth distribution fairness in a network. Accordingly, in these situations, a minimal tolerable bandwidth distribution fairness can be identified such that AP channel frequency profile settings associated with an optimal, or near-optimal, network throughput capacity can be identified/selected. Alternatively, a minimum tolerable throughput capacity can be identified such that AP channel frequency profile settings associated with an optimal, or near-optimal, bandwidth distribution fairness can be identified/selected.

At block 506, each of the APs is instructed to use its assigned channel frequency profile. Note that typically, each AP will already be using a communication channel defined by a certain center-frequency and channel-width. As such, each AP is directed to adjust/change its existing center-frequency setting and/or channel-width setting according to the assigned channel frequency profile. Recall that this is possible because the center frequency and the channel-width for each AP are treated as a dynamically configurable parameters, allowing each AP's channel frequency profile to be continuously or periodically changed such that the entire frequency spectrum available to the APs is effectively utilized and/or interference between APs (in physical proximity) using the same (or overlapping) communication channel(s) is avoided or limited. As discussed above, this in turn enhances the overall throughput capacity and/or bandwidth distribution fairness of the wireless network.

Exemplary Formulations

As noted above, in at least some embodiments, the overall throughput capacity and bandwidth distribution fairness can be defined in the form of a "solvable" optimization problem capable of being "solved" by one or more algorithms. As such, one or more of the algorithms can be used to evaluate information associated with the composition of a wireless network to identify and select optimal, or near-optimal, channel frequency profile settings for each of one or more APs in a wireless network, such as wireless network 102 described above.

In this regard, certain practical limitations can be recognized and addressed. To avoid potential frequency spectrum fragmentation, APs can be assigned to use communication channels having contiguous frequency intervals along the available frequency spectrum. Also, due to hardware constraints, certain APs may be capable of using only contiguous frequency intervals. As will be appreciated and understood by those skilled in the art, these, and potentially other assumptions, may be useful in characterizing an optimization problem to be solved by one or more optimization algorithms directed to identifying/selecting AP channel frequency profiles.

Problem Formulation

While any suitable approach for presenting information associated with the current composition of a network as a solvable optimization problem can be followed, in at least some embodiments, an approach which assumes each AP to have a fixed (but not necessarily uniform) transmission power $P_i$ and a fixed location is followed.

Specifically, let a network consist of n access points $AP_1, \ldots, AP_n$. Given fixed locations and transmission powers ($P_i$), we can determine a conflict-graph $G=(V, E)$ (i.e. interference graph) of the wireless network as follows: every AP is represented by a node i∈V and there is an edge between two APs if they have significantly overlapping coverage regions and should therefore avoid transmitting on the same frequency Practically, an edge can be modeled (i, j)∈E if simultaneous transmission of both $AP_i$ and $AP_j$ could result in harmful interference at some client in the network. This simplification is advantageous as it is conservative and allows for additional optimizations that could further enhance the ultimate solution.

Using this practical approach, the interference relationship between neighboring APs can be determined in an ad hoc fashion (e.g., by APs using beacon messages to probe their proximity to other APs, or by client feedback). Additionally or alternatively, the interference relationship between neighboring APs may be statically provided. For an $AP_j$, a set of all neighboring APs that are potentially in conflict with $AP_i$ can be denoted as N(i), where $N_i=\{AP_j|(i,j)\in E\}$.

Continuing, let the total demand of clients that are associated to $AP_i$ be denoted by $D_i$ bits per second (bits/s). This demand, along with the conflict/interference graph, forms the input to the one or more optimization algorithms to be used. The load that an AP can provide to one or more client devices depends on its load demand (from all client devices associated with it) and on the channel-width of the communication channel it is using, Let $B_i$ be the channel-width allocated to $AP_i$ and let $B_{tot}$ be the total available frequency spectrum. As pointed out, the load that an AP can provide to its assigned clients the traffic load (in bits/s) can be modeled as $$L_i = \min\{\chi B_i, D_i\}$$

where $\chi$ is a constant that captures how efficiently the available frequency spectrum can be utilized.

With respect to expressing non-interfering center-frequency and channel-width (i.e., channel bandwidth) settings, let $S_i$ be a non-interfering (i.e., not associated with communication channel interference) center-frequency and $B_i$ be a non-interfering channel-width to be assigned to each AP (APi). In this regard, $AP_i$ uses a frequency interval (i.e., a portion of available frequency spectrum) $I_i=S_i, S_i+B_i$ for serving one or more client devices and satisfies a load of $L_i=\min\{\chi B_i, D_i\}$. A center-frequency and/or channel-width assignment is non-interfering if the assigned intervals $I_i$ and $I_j$ of any two neighboring APs i and j, (i, j)∈E, is non-overlapping.

As noted above, in many cases there can be a tradeoff between achieving an optimal (or near-optimal) throughput capacity and an optimal, or near-optimal, bandwidth distribution fairness in a network. As such, for the purposes of describing the exemplary algorithmic optimization approaches below, a minimum tolerable bandwidth distribution fairness is identified such that AP channel frequency profile settings associated with an optimal, or near-optimal, throughput capacity can be identified/selected. In this regard, achieving an optimal, or near-optimal, throughput capacity can be expressed as $$L_{SYS} = \sum_{i \in V} L_i.$$

Algorithmic Formulations

In the following discussion, three exemplary types of algorithmic formulations are presented. First, an integer linear program (ILP)—based formulation is described. This ILP-based formulation is especially suited for small-scale networks. Specifically, while this formulation is capable of providing a solution (identifying/selecting AP channel frequency profile settings) associated with the most enhanced (optimal, or near optimal) overall wireless network throughput capacity and/or bandwidth distribution fairness, it is less computationally efficient than other non-ILP algorithms and is therefore less practical for large-scale networks. Second, a linear program (LP)—based approximation formulation is described which, while providing a solution which can be associated with a slightly less enhanced overall wireless network throughput capacity and/or bandwidth distribution fairness than the ILP—based formulation, is more computationally efficient than the ILP algorithm. Finally, a heuristic-based formulation which is generally easier than the first two approaches to deploy, and also more computationally efficient than the ILP algorithm, is described.

ILP—based formulation—in at least some embodiments, an exemplary ILP algorithm characterized in the following formulation can be used to evaluate information associated with the composition of a wireless network to identify and select optimal, or near-optimal, channel frequency profile settings for each of one or more APs in the wireless network. Let $b_i$ and $s_i$ be variables that denote the channel-width (i.e., bandwidth) and center-frequency allocated to $AP_i$. Further, for each pair of APs i and j with (i,j)∈E, binary indicator variables $f_{ij}$ and $f_{ji}$ are used. As such, the following ILP formulation can be used to evaluate information associated with the current composition of a wireless network to identify/determine channel frequency profile settings (i.e., center-frequency and channel-width settings) for each of one or more APs in the wireless network that are associated with an optimal, or near-optimal, network throughput capacity:

$$\max \sum_{AP_i \in V} b_i$$

| | |
|---|---|
| $s_i+b_i-s_j-f_{ij}\cdot B<0, \forall(i,j)\in E$ | (First Constraint) |
| $s_j+b_j-s_i-f_{ji}\cdot B<0, \forall(i,j)\in E$ | (Second Constraint) |
| $f_{ij}+f_{ji}\leq 1, \forall(i,j)\in E$ | (Third Constraint) |
| $s_i+b_i\leq F_{top}, \forall AP_i \in V$ | (Fourth Constraint) |
| $s_i\geq F_{bottom}, \forall AP_i \in V$ | (Fifth Constraint) |
| $\chi \cdot b_i \leq D_i, \forall AP_i \in V$ | (Sixth Constraint) |
| $f_{ij},f_{ji}\in\{0,1\}, \forall(i,j)\in E$ | (Seventh Constraint) |

With regard to the above formulation, the first two constraints force the auxiliary variables $f_{ij}$ and $f_{ji}$ to behave as follows. The variable $f_{ij}$ is 1 if and only if the top-frequency $s_i+b_i$ of $AP_i$'s frequency interval is a higher frequency ("above") the lower end $s_j$ of $AP_j$'s spectrum interval. Conversely, $f_{ji}=1$ if and only if $s_j+b_j>s_i$. Considering two intervals $[s_i,s_i+b_i]$ and $[s_j,s_j+b_j]$, it is observable that these intervals overlap if and only if $s_i+b_i>s_j$ and $s_j+b_j>s_i$, (i.e., if the upper end of the frequency interval of both intervals is higher than the lower end of the frequency interval of the respective other interval). The third constraint therefore guarantees that no two neighboring channel frequency intervals in the graph overlap, i.e., the resulting channel assignment is non-overlapping and thus non-interfering. The fourth and fifth constraints ensure any assigned interval is located within the available spectrum ($F_{bottom}$, $F_{top}$). The sixth constraint expresses that raising the bandwidth above the demand does not increase throughput. Finally, the seventh constraint enforces that all variables $f_{ij}$ are set to integer values 0 and 1.

Recall that for the purposes of describing the exemplary algorithmic optimization approaches herein, a minimal tolerable bandwidth distribution fairness can be identified such that AP channel frequency profile settings associated with an optimal, or near-optimal, throughput capacity can be identified/selected. As such, the above ILP based formulation can also include any suitable bandwidth distribution fairness constraint, such as the following: a minimum fair spectrum share that $AP_i$ should receive can be defined as $$\phi(i) = \left( D_i \bigg/ \left( D_i + \sum_{j\in N(i)} D_j \right) \right).$$

This minimum fair spectrum share can be enforced by adding the following constraint to the ILP above:

$$b_i \geq \alpha \phi(i) \cdot B_{top}, \forall AP_i \in V$$

In this regard, the constant α characterizes the trade-off between bandwidth distribution fairness and throughput capacity. The smaller the α value, the more flexibility the ILP solver has to sacrifice bandwidth distribution fairness in order to improve/enhance throughput capacity. With respect to representing/defining bandwidth distribution fairness, any suitable expression/definition can be included in the above ILP as a constraint without deviating from the claimed subject matter.

The above ILP formulation assumes center-frequencies and channel-widths to be arbitrarily tunable. As discussed above, this is in contrast to existing wireless network platforms which typically have a small limited number of available channel-widths to which the AP's radio transceiver can be tuned. Nevertheless, discrete sets of channel-widths can easily be incorporated in the above ILP formulation, if desired, by restricting the variables $b_i$ to belong to an appropriate corresponding set of integers. As such, the above ILP-based formulation is compatible in networks (1) with AP's limited to discrete center-channel and/or channel-width adjustments and/or (2) which adhere to standards, such as current IEEE 802.11b/g standards for instance, which dictate discrete channel-widths.

Finally, as noted above, the above ILP algorithm formulation is most suitable for small-scale networks since it is less computationally efficient than other non-ILP algorithms. Specifically, as will be appreciated and understood by those skilled in the art, the dynamic-width channel-assignment problem presented is NP-hard.

LP-based approximation formulation—in at least some embodiments, an exemplary LP—based formulation, characterized as follows, can be used to evaluate information associated with the composition of a wireless network to identify and select optimal, or near-optimal, channel frequency profile settings for each of one or more APs in the wireless network. As will be appreciated and understood by those skilled in the art, the following exemplary LP-based formulation includes packing-problem aspects and coloring-problem aspects. As such, an exemplary packing algorithm formulation that avoids frequency spectrum fragmentation will first be described, followed by an exemplary LP algorithm that uses the packing algorithm.

First, with respect to the exemplary packing algorithm formulation, assume that the sizes of all channel frequency intervals followed a power series: i.e., each interval has length $2^k$ for some integer k. First, potential channel frequency intervals can be sorted in a decreasing order based on the size of their respective bandwidth (channel-width) and packed, one by one, into the available frequency spectrum, conceptually characterized as real axis [0,+∞]. For purposes of this discussion, as will be appreciated and understood by those skilled in the art, packing can be thought of as a conceptual way to consider potential channel frequency intervals, with respect to the available frequency spectrum, to assign to network APs. To avoid frequency spectrum fragmentation, potential channel frequency intervals are packed in a manner that fills up the available frequency spectrum starting at one end closest to the origin of the real axis. When packing frequency intervals in this way, it can be proven by induction that whenever an interval of size $2^k$ is packed, all available frequency intervals (the spectrum gaps still available) are of size at least $2^k$ (in fact, they are an integer multiple of $2^k$). Hence, in this case, frequency spectrum fragmentation is avoided and, as pointed out before, the total bandwidth required to pack all intervals is at most two times $\delta(b)$, where $\delta(b)$ is defined as:

$$\delta(b) = \max_{u \in V}\left(b_u + \sum_{v \in N(u)} b_v\right)$$

Continuing, if the channel frequency intervals to be packed do not follow a power series, they can be rounded accordingly. Suppose that the given channel frequency intervals are $b_0 \geq \ldots \geq b_N$. As such, we can round each $b_i$ to $\tilde{b}_i = \lceil b_i/b_0 \rceil \cdot b_0$, where the $\lceil x \rceil = 2^{-2k}$, for some integer k. Consequently, all intervals can be packed within a maximum length of:

$$\max_{u \in V}\left(\tilde{b}_u + \sum_{v \in N(u)} \tilde{b}_v\right) \leq 2\delta(b)$$

Finally, the assigned channel frequency intervals in $[0, 2\delta(b)]$ can be linearly mapped to the entire available spectrum interval $[F_{bottom}, F_{top}]$, thus packing demands b in a maximum interval of $2\delta(b)$.

The exemplary packing algorithm formulation above is effective in assuring the performance for the worst AP (with a maximum load demand in its neighborhood/vicinity). While this is effective from a fairness perspective, it may harm throughput in scenarios in which some parts of the graph are dense and others are sparse. Consider, for instance, a dense clique (many APs within mutual interference range) and a line-network attached to it (a 'string' of APs where each AP interferes only with its 'right' and 'left' neighbor). Due to the linear scaling at the end of the packing procedure, APs on the line will not utilize the available spectrum efficiently).

Below, an LP-based algorithm using this packing procedure for enhancing the overall throughput capacity without sacrificing bandwidth allocation fairness is described. In this regard, the above packing algorithm can be used as a building block that packs any demand vector b into a frequency interval of width $[0, 2\delta(b)]$. The idea, as will be appreciated and understood by those skilled in the art, is to employ an LP-based algorithm to search for a demand vector with worst-case performance $\delta(b)$ and enhanced overall throughput capacity. The packing algorithm can then be run over the resulting demand vector b to pack it into $[0, 2\delta(b)]$. Accordingly, the following exemplary LP-based algorithm can be implemented:

$$B_{tot}(\alpha) \triangleq \max_{b} \sum_u b_u, \text{ subject to:} \quad (LP\text{-based formulation equation 1})$$

$$b_u \geq \alpha \phi_u \cdot B_{tot}, \forall u \quad (LP\text{-based formulation equation 2})$$

-continued $$b_u + \sum_{v \in N(u)} b_v \leq B, \forall u \quad (LP\text{-based formulation equation 3})$$

Note that constraint $$b_u + \sum_{v \in N(u)} b_v \leq B,$$

$\forall u$ above ensures that the computed vector b results in a feasible solution. Note also that the constraint $b_u \geq \alpha \phi_u \cdot B_{tot}$, $\forall u$ ensures/maintains fairness by guaranteeing node u a resource share of $ab_u$. By varying the constant scaling parameter $\alpha$ from 0 to some maximum value $\alpha^*$, different tradeoffs between bandwidth distribution fairness and throughput capacity can be achieved. Using the maximum value $\alpha^*$ maximizes the worst node's performance; this value can be determined using the following LP:

$$\alpha^* = \max_{b,\alpha} \alpha, \text{ subject to:} \quad (LP\text{-based formulation equation 4})$$

$$b_u \geq \alpha \phi_u \cdot B_{tot}, \forall u$$

$$b_u + \sum_{v \in N(u)} b_v \leq B, \forall u$$

The LP-based algorithm formulation above allows for various additional parameters directed to further tuning the bandwidth distribution fairness and throughput capacity trade-off. Furthermore, this algorithm can be employed in any suitable fashion. By way of example and not limitation, in at least some embodiments, an optimal fairness parameter $\alpha = \alpha^*$ is determined using LP-based equation 4 above. Then, using this $\alpha$, the LP-based equation 1 above can be used to compute $B_{total}(\alpha)$. This amounts to a conservative approach that maximizes the sum throughput capacity (by "flattening" the demands at the nodes) while assuring the maximum level of bandwidth distribution fairness at the worst node. It is to be appreciated and understood that the LPs formulated above can be solved using either an LP solver or using standard, and efficient approximation algorithm.

Note that the packing algorithm formulation and LP formulation described above present a way for allocating channel frequency intervals while avoiding potential frequency spectrum fragmentation. As such, these formulations are ideally suited for network environments, such as environment 100 described above, where these intervals can be arbitrarily placed with respect to the available frequency spectrum (i.e., AP center-frequencies and channel-widths are arbitrarily tunable). Nevertheless, by rounding the resulting assignment to comply with the available bandwidth options, the above LP-based formulation is compatible in networks (1) with AP's limited to discrete center-channel and/or channel-width adjustments and/or (2) adhering to standards, such as current IEEE 802.11b/g standards for instance, which dictate discrete channel-widths. Practically, this compatibility can be accomplished in any suitable way. By way of example and not limitation, in at least some embodiments this is accomplished by using an additional simple greedy tuning step to increase the channel-width bandwidth wherever possible. The tuning step considers all the AP assignments one by one. For each AP, if a wider frequency interval than that assigned to the AP is available, the wider frequency interval will be assigned to the AP instead. Similarly, if a frequency interval associated with a center-channel closer to the origin of the real axis is available, then the closer frequency interval will be assigned to the AP instead. This tuning step can be repeated any number of times until no further improvement is possible.

Heuristic-based formulation—in at least some embodiments, exemplary heuristic—based algorithms characterized in the following exemplary formulation can be used to evaluate information associated with the composition of a wireless network to identify and select optimal, or near-optimal, channel frequency profile settings for each of one or more APs in a wireless network. As will be appreciated by those skilled in the art, these heuristic—based algorithms are generally simpler and easier to deploy than the above ILP —based and LP —based algorithms yet still provide an effective way to implement the disclosed techniques.

The heuristic—based algorithm formulations described below include an exemplary "greedyraising" algorithm which utilizes an exemplary "greedypack" packing algorithm to consider potential channel frequency intervals (with respect to the available frequency spectrum) to assign to network APs. In this regard, three possible approaches can be followed with respect to defining the order in which the network APs will be considered with respect to their potential channel frequency interval assignments. As such, the "greedyraising" and "greedypack" algorithms will first be described, followed by the three possible ordering approaches.

---

GreedyRaising Algorithm

Input: An ordering $\mathcal{O}$ of APs
Output: A non-overlapping packing of frequency bandwidth intervals in the available frequency spectrum.
1. Set parameter $\theta := 1$ and let successful := FALSE;
2. While not successful do 3. Let $\phi'_i := \theta \cdot D_i \Big/ \Big( D_i + \sum_{j \in N(i)} D_j \Big)$ for each $AP_i \in V$.

4. Let $B_i$ be the largest bandwidth options s.t. $B_i \leq \phi'_i \cdot B$
5. successful := GreedyPack $(B_1, \ldots, B_N, \mathcal{O})$.
6. $\theta := \theta/2$.
7. end for
8. In the order of $\mathcal{O}$:for each $AP_i \in V$ do
9.    Let $\hat{B}_i$ be the next higher bandwidth option of $B_i$.
10.    successful := GreedyPack $(B_1, \ldots, \hat{B}_i, \ldots, B_N, \mathcal{O})$.
11.    if successful = TRUE then $B_i := \hat{B}_i$.
12. end for

---

GreedyPack Algorithm $(B_1, \ldots, B_N, \mathcal{O})$.

Input: Bandwidths $B_1, \ldots, B_N$ and an ordering $\mathcal{O}$ of APs
Output: If possible, a non-overlapping packing of frequency bandwidths into the available spectrum. Return false if no packing is found
1. In the order of $\mathcal{O}$: for each $AP_i \in V$ do
2.    pack an interval of channel-width $B_i$ in the lowest possible non-overlapping frequency.
3. end for
4. If the interval for APs was successfully packed within the total bandwidth $[F_{bottom}, F_{top}]$ then
5.    return for each $AP_i \in V$ its starting frequency $S_i$ in the successful packing.
6. else return false
7. end if

---

The "greedypack" algorithm above takes as its input an ordering of the APs (for example, from heaviest to lightest load) and a bandwidth requirement for each AP. It then proceeds in order of the given ordering and, when considering $AP_i$, "greedily" attempts to pack a non-overlapping frequency interval of channel-width $B_i$ into the spectrum. Intervals are packed at the lowest possible frequency at which the interval is non-overlapping with any previously assigned interval at a neighbor AP.

Depending on the given ordering and bandwidth input, this greedy-packing scheme may not succeed. If the desired channel-widths are too wide, it becomes theoretically impossible to correctly pack. However, even if it is theoretically possible to achieve a valid assignment of bandwidth intervals to APs, the greedy allocation may make suboptimal decisions and get stuck in the process. In this case, the subroutine returns false, thereby indicating that the process should be re-tried using narrower channel-widths.

The basic idea of the "GreedyRaising" algorithm is as follows. Starting from a feasible initial assigned value, the algorithm heuristics "probe" APs one-by-one to check whether the greedy-packing (performed by the "greedypack" algorithm) remains successful when/if the AP's channel-width is raised. More specifically, the "GreedyRaising" algorithm considers all APs in a given sequence $\mathcal{O}$.. When considering an AP, the AP's channel-width is increased to the next higher bandwidth option, and the "greedypack" algorithm is called in order to see whether is still successful. If it is, the higher bandwidth is adopted; if not, the AP's channel-width is reset to its initial assigned value.

Regarding to the ordering $\mathcal{O}$(the order in which APs are considered in both of the algorithms above), three exemplary approaches can be followed with respect to defining the order in which the network APs will be considered with respect to their potential channel frequency interval assignments. Specifically, a first approach, which can be termed "most-congested-first", involves sorting APs are in decreasing order of their traffic load. A second approach, which can be termed "random", involves ordering APs randomly. Finally, a third approach, which can be termed "smallest-last" is described as follows. Consider an ordering $\mathcal{O}$ and let $\tau_i$ be the number of APs that are neighbors of $AP_i$ and that appear before $AP_i$ in $\mathcal{O}$.. The smallest-last ordering is an ordering which minimizes the maximum $\tau_i$ over all APs in the network. This ordering is based on the observation than when considering $AP_i$ in the "GreedyPack" algorithm, $\tau_i$ reflects the number of potentially interfering intervals that have already been packed in $AP_i$'s vicinity/neighborhood. Intuitively, the fewer such intervals, the easier it is to pack $AP_i$'s allocated bandwidth chunk. Considering the APs in smallest-last order minimizes the maximum obstruction that any AP faces when its bandwidth interval is packed. As will be appreciated and understood by those skilled in the art, the smallest-last ordering can be computed efficiently in a single pass:

1. j:=N; H:=G;
2. Let $AP_j$ be a minimum degree AP in H;
3. Remove $AP_j$ from H and set j:=j−1;
4. Return to step 2 until H is empty;
5. Output $\mathcal{O}$=($AP_1, \ldots, AP_N$).

As noted above, one of the assumptions with respect to the exemplary algorithmic formulations described above is that any communication channels with overlapping bandwidths wilt cause transmission interference (i.e., overlapping frequency intervals assigned to neighboring APs should be avoided). While this is a conservative assumption, these exemplary formulations can easily be adapted to incorporate co-channel interference. Particularly, and as will be appreciated and understood by those skilled in the art, if it is known how much frequency spectrum overlap between neighboring APs is tolerable, the above exemplary algorithms can be adjusted in any suitable manner, as will be understood and appreciated by those skilled in the art. By way of example and not limitation, the following adjustments can be implemented. Finally, the heuristic-based algorithms packing scheme of all the heuristic approaches above will be able to pack the bandwidths more tightly if it is known how much frequency spectrum overlap between neighboring APs is tolerable.

Conclusion

Although embodiments of techniques for enhancing overall throughput capacity and bandwidth distribution fairness among access points in a wireless network have been described in language specific to structural features and/or methods, it is to be understood that the subject of the appended claims is not necessarily limited to the specific features or methods described. Rather, the specific features and methods are disclosed as exemplary implementations.

What is claimed is:

1. A method comprising:
   for each corresponding access point (AP) of multiple APs, providing wireless access to a network, determining, over any arbitrarily tunable center-frequency setting and arbitrarily tunable channel-width setting combination for configuring a channel of the corresponding AP that is within an available bandwidth of a wireless frequency spectrum of the network, a center-frequency setting and a channel-width setting combination for the channel based at least in part on:
      a current composition of the network;
      a current number of client devices associated with each of the multiple Aps;
      a current traffic demand of each of the client devices associated with each of the multiple APs;
      a minimization or elimination of channel overlap between the channel of the corresponding AP and channels of neighboring APs of the corresponding AP;
      determining a minimum allowable channel-width of the channel of the corresponding AP to facilitate a bandwidth distribution fairness among the corresponding AP and the neighboring APs of the corresponding AP based in part on the current number and the current traffic demand of the client devices associated with the corresponding AP and the neighboring APs; and
      determining a channel-width of the channel of the corresponding AP that:
         maximizes throughput capacity of the corresponding AP;
         is greater than or equal to the minimum allowable channel-width; and
         minimizes or eliminates the overlap;
   dynamically assigning a channel frequency profile to each of the multiple APs, each channel frequency profile specifying a channel having the center-frequency setting and the channel-width setting combination determined for each corresponding AP of the multiple APs; and
   adjusting a configurable channel in each of multiple APs based at least in part on the center-frequency setting and the channel-width setting combination specified in each corresponding channel frequency profile.

2. A method as recited in claim 1, wherein dynamically assigning comprises selecting, as a function of information associated with the current composition of the network, one or more assigned settings associated with the channel frequency profile.

3. A method as recited in claim 2, wherein the selecting includes evaluating the information at least in part by utilizing an integer linear program (ILP) algorithm that utilizes at least channel overlap associated with the multiple APs to determine channel-width settings associated with optimal, or near optimal, throughput capacity in the network.

4. A method as recited in claim 2, wherein the dynamically assigning further comprises directing each of the multiple APs to adjust one or more of its settings to the assigned settings.

5. A method as recited in claim 4, wherein one or both of the selecting and the directing is performed at least in part by one or both of:
   a server device communicatively linked to the wireless network; or
   one or more of the multiple APs associated with the wireless network.

6. A method as recited in claim 2, wherein the information includes one or more of:
   a current communication traffic load associated with each of the multiple APs;
   a channel frequency profile for each of the multiple APs; or
   a transmission power for each of the multiple APs.

7. A method as recited in claim 1, wherein information associated with the current composition of the network is received from one or more of:
   at least one of the multiple APs; or
   one or more client devices associated with the network.

8. One or more computer-readable memory devices having computer-readable instructions thereon which, when executed by a computer, implement the method of claim 1.

9. One or more computer-readable memory devices comprising computer-executable instructions that, when executed, perform acts comprising:
   collecting data about a wireless network, the data including a current traffic demand of each client device associated with each of the plurality of access points (APs) providing wireless access to the wireless network, wherein each of the plurality of APs have arbitrarily tunable center-frequency settings and arbitrarily tunable channel-width settings for configuring a channel that is within any portion of an available bandwidth of the wireless network; and
   evaluating the data;
   determining, based in part on the evaluating, a channel having a center-frequency setting selected from among any of the arbitrarily tunable center-frequency settings and a channel-width setting selected from among any of the arbitrarily tunable channel-width settings for each of the plurality of APs based in part on:
      a minimization or elimination of interference between corresponding channels of each of the plurality of APs;
      a minimum allowable channel-width for each subset of neighboring APs of the plurality of APs that facilitates a bandwidth distribution fairness among each subset of neighboring APs based in part on the current traffic demand of the client devices associated with each the subset of neighboring APs; and
      a maximization of throughput capacity in the wireless network; and
   allocating the channel having the center-frequency setting and the channel-width setting determined for each of the plurality of APs.

10. One or more computer-readable memory devices as recited in claim 9, further comprising instructing each of the plurality of APs to use the center-frequency setting and the channel-width setting allocated to a respective one of the plurality of APs.

11. One or more computer-readable memory devices as recited in claim 10, wherein the acts are performed by one or more management modules located on one or more devices communicatively linked to the wireless network.

12. One or more computer-readable memory devices as recited in claim 9, wherein at least one of:
the center-frequency setting allocated to at least two of the plurality of APs is different; or
the channel bandwidth setting allocated to at least two of the plurality of APs is different.

13. One or more computer-readable memory devices as recited in claim 9, wherein the channel-width setting allocated for an individual AP of the plurality of APs is based at least in part on a current traffic load for the individual AP and the bandwidth distribution fairness is based in part on an equitable allocation of channel bandwidth among each of the client devices associated with the individual AP.

14. One or more computer-readable memory devices as recited in claim 13, wherein the current traffic load is determined by at least one of:
a current number of client devices associated with the individual AP; or
a current traffic demand of each of the client devices associated with the individual AP.

15. One or more computer-readable memory devices as recited in claim 9, wherein the data is associated with one or more of:
a traffic load for each of one or more of the plurality of APs; or
a current center-frequency setting and a current channel-width setting for each of one or more of the plurality of APs.

16. A system comprising:
one or more memories;
one or more processors;
one or more management modules stored on the one or more memories and executed by the one or more processors and associated with a network, the one or more management modules comprising:
at least one storage component to store information received from one or more devices associated with the network, the information including a current number of client devices and a current traffic demand of each of the client devices associated with each of multiple nodes providing wireless access to the network, each of the multiple nodes having an arbitrarily tunable center-frequency setting and an arbitrarily tunable channel-width setting for configuring a channel having any center-frequency and channel-width within a total available bandwidth of the network;
at least one selection component to:
calculate a bandwidth distribution fairness for each of the multiple nodes based in part on the current number of client devices and the current traffic demand of each of the client devices associated with each of multiple nodes;
determine, for each of the multiple nodes, a center-frequency setting and a channel-width setting that maximizes a throughput capacity of a corresponding node of the multiple nodes based in part on the calculated bandwidth distribution fairness of the corresponding node; and
allocate a channel frequency profile to each of the multiple nodes, the channel frequency profile specifying the center-frequency setting and the channel-width setting; and
at least one communication component to direct each of the multiple nodes to use the channel frequency profile allocated to it.

17. A system as recited in claim 16, wherein the one or more management modules are distributed over multiple computing devices associated with the network.

18. A system as recited in claim 16, wherein at least a portion of the multiple nodes are access points (APs).

19. A system as recited in claim 16, wherein the at least one selection component utilizes one or more optimization algorithms to evaluate the information and compute the channel frequency profiles to allocate to each of the one or more nodes.

* * * * *

UNITED STATES PATENT AND TRADEMARK OFFICE
CERTIFICATE OF CORRECTION

| | | |
|---|---|---|
| PATENT NO. | : 8,243,612 B2 | Page 1 of 1 |
| APPLICATION NO. | : 11/832624 | |
| DATED | : August 14, 2012 | |
| INVENTOR(S) | : Bahl et al. | |

It is certified that error appears in the above-identified patent and that said Letters Patent is hereby corrected as shown below:

Title page, item (75), under "Inventors" column 1, line 4, delete "Sri Hari Narlanka" and insert -- Gopala Sri Hari Narlanka --, therefor.

In the Specification

Column 4, line 58, delete "her" and insert -- further --, therefor.

Column 5, line 4, delete "off" and insert -- of --, therefor.

Column 6, line 66, delete "is" and insert -- this --, therefor.

Column 16, line 63, delete "wilt" and insert -- will --, therefor.

In the Claims

Column 18, line 12, Claim 4, after "the" insert -- one or more --.

Signed and Sealed this
Third Day of February, 2015

Michelle K. Lee
*Deputy Director of the United States Patent and Trademark Office*